United States Patent
Patel et al.

(10) Patent No.: US 9,172,674 B1
(45) Date of Patent: *Oct. 27, 2015

(54) MANAGING REQUEST ROUTING INFORMATION UTILIZING PERFORMANCE INFORMATION

(75) Inventors: Imran S. Patel, Bellevue, WA (US);
Colm MacCarthaigh, Seattle, WA (US);
Valeri Liborski, Bellevue, WA (US);
Prashanth Acharya, Bellevue, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 455 days.

This patent is subject to a terminal disclaimer.

(21) Appl. No.: 13/528,664

(22) Filed: Jun. 20, 2012

Related U.S. Application Data

(60) Provisional application No. 61/613,921, filed on Mar. 21, 2012.

(51) Int. Cl.
*G06F 15/16* (2006.01)
*H04L 29/12* (2006.01)
*H04L 29/08* (2006.01)

(52) U.S. Cl.
CPC ............ *H04L 61/1511* (2013.01); *H04L 67/32* (2013.01)

(58) Field of Classification Search
CPC .......................... H04L 61/1511; H04L 67/32
USPC ........................................................ 709/217
See application file for complete search history.

(56) References Cited

U.S. PATENT DOCUMENTS

| | | | |
|---|---|---|---|
| 5,341,477 A | 8/1994 | Pitkin et al. | |
| 5,611,049 A | 3/1997 | Pitts | |
| 5,774,660 A | 6/1998 | Brendel et al. | |
| 5,852,717 A | 12/1998 | Bhide et al. | |

(Continued)

FOREIGN PATENT DOCUMENTS

| | | | |
|---|---|---|---|
| CN | 1422468 A | 6/2003 | |
| CN | 1605182 A | 4/2005 | |

(Continued)

OTHER PUBLICATIONS

Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].

(Continued)

*Primary Examiner* — David X Yi
(74) *Attorney, Agent, or Firm* — Knobbe, Martens, Olson & Bear, LLP

(57) ABSTRACT

Systems and methods for managing requesting routing functionality associated with resource requests for one or more resources associated with a content provider are provided. The request routing functionality can correspond to the processing of domain name service ("DNS") requests for resources by computing devices and the resolution of the DNS requests by the identification of a network address of a computing device that will provide the requested resources. Based on the processing resource requests initiated by a client computing device, a CDN service provider can obtain performance information from client computing devices and correlate the performance information into a prioritized list for classes of client computing devices. The prioritized list can be utilized in resolving subsequent DNS queries.

18 Claims, 9 Drawing Sheets

(56) References Cited

U.S. PATENT DOCUMENTS

| | | |
|---|---|---|
| 5,892,914 A | 4/1999 | Pitts |
| 5,933,811 A | 8/1999 | Angles et al. |
| 5,974,454 A | 10/1999 | Apfel et al. |
| 6,016,512 A | 1/2000 | Huitema |
| 6,026,452 A | 2/2000 | Pitts |
| 6,052,718 A | 4/2000 | Gifford |
| 6,078,960 A | 6/2000 | Ballard |
| 6,085,234 A | 7/2000 | Pitts et al. |
| 6,098,096 A | 8/2000 | Tsirigotis et al. |
| 6,108,703 A | 8/2000 | Leighton et al. |
| 6,157,942 A | 12/2000 | Chu et al. |
| 6,167,438 A | 12/2000 | Yates et al. |
| 6,182,111 B1 | 1/2001 | Inohara et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,405,252 B1 | 6/2002 | Gupta et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,505,241 B2 | 1/2003 | Pitts |
| 6,529,953 B1 | 3/2003 | Van Renesse |
| 6,553,413 B1 | 4/2003 | Lewin et al. |
| 6,560,610 B1 | 5/2003 | Eatherton et al. |
| 6,611,873 B1 | 8/2003 | Kanehara |
| 6,643,357 B2 | 11/2003 | Lumsden |
| 6,654,807 B2 | 11/2003 | Farber et al. |
| 6,658,462 B1 | 12/2003 | Dutta |
| 6,665,706 B2 | 12/2003 | Kenner et al. |
| 6,678,791 B1 | 1/2004 | Jacobs et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 * | 9/2004 | Kumar et al. .............. 370/392 |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,874,017 B1 | 3/2005 | Inoue et al. |
| 6,928,467 B2 | 8/2005 | Peng |
| 6,928,485 B1 | 8/2005 | Krishnamurthy et al. |
| 6,941,562 B2 | 9/2005 | Gao et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 * | 1/2006 | Farhat et al. .............. 709/224 |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,031,445 B2 | 4/2006 | Lumsden |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,136,922 B2 | 11/2006 | Sundaram et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,269,784 B1 | 9/2007 | Kasriel et al. |
| 7,274,658 B2 | 9/2007 | Bornstein et al. |
| 7,289,519 B1 | 10/2007 | Liskov |
| 7,293,093 B2 | 11/2007 | Leighton et al. |
| 7,308,499 B2 | 12/2007 | Chavez |
| 7,310,686 B2 | 12/2007 | Uysal |
| 7,316,648 B2 | 1/2008 | Kelly et al. |
| 7,320,131 B1 | 1/2008 | O'Toole, Jr. |
| 7,321,918 B2 | 1/2008 | Burd et al. |
| 7,363,291 B1 | 4/2008 | Page |
| 7,373,416 B2 | 5/2008 | Kagan et al. |
| 7,376,736 B2 | 5/2008 | Sundaram et al. |
| 7,380,078 B2 | 5/2008 | Ikegaya et al. |
| 7,398,301 B2 | 7/2008 | Hennessey et al. |
| 7,406,512 B2 | 7/2008 | Swildens et al. |
| 7,430,610 B2 | 9/2008 | Pace et al. |
| 7,441,045 B2 | 10/2008 | Skene et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,565,407 B1 | 7/2009 | Hayball |
| 7,573,916 B1 | 8/2009 | Bechtolsheim et al. |
| 7,581,009 B1 | 8/2009 | Hsu et al. |
| 7,594,189 B1 | 9/2009 | Walker et al. |
| 7,596,619 B2 | 9/2009 | Leighton et al. |
| 7,623,460 B2 | 11/2009 | Miyazaki |
| 7,624,169 B2 | 11/2009 | Lisiecki et al. |

(56) References Cited

U.S. PATENT DOCUMENTS

| | | |
|---|---|---|
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,622 B1 | 2/2010 | Douglis et al. |
| 7,664,879 B2 | 2/2010 | Chan et al. |
| 7,680,897 B1 | 3/2010 | Carter et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlstedt et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,787,380 B1 | 8/2010 | Aggarwal et al. |
| 7,792,989 B2 | 9/2010 | Toebes et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,836,177 B2 | 11/2010 | Kasriel et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | Van De Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,024,441 B2 | 9/2011 | Kommula et al. |
| 8,028,090 B2 | 9/2011 | Richardson et al. |
| 8,041,809 B2 | 10/2011 | Sundaram et al. |
| 8,041,818 B2* | 10/2011 | Gupta et al. ............. 709/226 |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,135,820 B2 | 3/2012 | Richardson et al. |
| 8,156,243 B2 | 4/2012 | Richardson et al. |
| 8,190,682 B2 | 5/2012 | Paterson-Jones et al. |
| 8,195,837 B2 | 6/2012 | Mccarthy et al. |
| 8,224,986 B1 | 7/2012 | Liskov et al. |
| 8,234,403 B2 | 7/2012 | Richardson et al. |
| 8,239,530 B2 | 8/2012 | Sundaram et al. |
| 8,250,211 B2 | 8/2012 | Swildens et al. |
| 8,250,219 B2* | 8/2012 | Raciborski et al. ............. 709/227 |
| 8,266,288 B2 | 9/2012 | Banerjee et al. |
| 8,266,327 B2 | 9/2012 | Kumar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,301,645 B1 | 10/2012 | Crook |
| 8,321,568 B2 | 11/2012 | Sivasubramanian et al. |
| 8,402,137 B2 | 3/2013 | Sivasubramanian et al. |
| 8,452,874 B2 | 5/2013 | Maccarthaigh et al. |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,521,851 B1 | 8/2013 | Richardson et al. |
| 8,521,908 B2 | 8/2013 | Holmes et al. |
| 8,527,658 B2 | 9/2013 | Holmes et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2* | 11/2013 | Ma et al. ............. 725/114 |
| 8,615,549 B2 | 12/2013 | Knowles et al. |
| 8,626,950 B1 | 1/2014 | Maccarthaigh et al. |
| 8,639,817 B2 | 1/2014 | Sivasubramanian et al. |
| 8,676,918 B2 | 3/2014 | Richardson et al. |
| 8,683,076 B2 | 3/2014 | Farber et al. |
| 8,688,837 B1 | 4/2014 | Richardson et al. |
| 8,732,309 B1 | 5/2014 | Richardson et al. |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 2001/0000811 A1 | 5/2001 | May et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0091786 A1 | 7/2002 | Yamaguchi et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0147774 A1 | 10/2002 | Lisiecki et al. |

(56) References Cited

U.S. PATENT DOCUMENTS

| | | |
|---|---|---|
| 2002/0150094 A1 | 10/2002 | Cheng et al. |
| 2002/0156911 A1 | 10/2002 | Croman et al. |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0188722 A1 | 12/2002 | Banerjee et al. |
| 2002/0198953 A1 | 12/2002 | O'Rourke et al. |
| 2003/0002484 A1 | 1/2003 | Freedman |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0101278 A1 | 5/2003 | Garcia-Luna-Aceves et al. |
| 2003/0120741 A1 | 6/2003 | Wu et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2004/0010621 A1 | 1/2004 | Afergan et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0059805 A1 | 3/2004 | Dinker et al. |
| 2004/0064501 A1 | 4/2004 | Jan et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |
| 2004/0167982 A1* | 8/2004 | Cohen et al. .................. 709/226 |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221034 A1 | 11/2004 | Kausik et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0157712 A1 | 7/2005 | Rangarajan et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0198334 A1 | 9/2005 | Farber et al. |
| 2005/0198571 A1 | 9/2005 | Kramer et al. |
| 2005/0216569 A1 | 9/2005 | Coppola et al. |
| 2005/0216674 A1 | 9/2005 | Robbin et al. |
| 2005/0229119 A1 | 10/2005 | Torvinen |
| 2005/0232165 A1 | 10/2005 | Brawn et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1* | 2/2006 | Karstens ........................ 370/352 |
| 2006/0041614 A1 | 2/2006 | Oe |
| 2006/0047787 A1 | 3/2006 | Agarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0143293 A1 | 6/2006 | Freedman |
| 2006/0149529 A1 | 7/2006 | Nguyen et al. |
| 2006/0155823 A1 | 7/2006 | Tran et al. |
| 2006/0161541 A1 | 7/2006 | Cencini |
| 2006/0168088 A1 | 7/2006 | Leighton et al. |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0218265 A1 | 9/2006 | Farber et al. |
| 2006/0218304 A1 | 9/2006 | Mukherjee et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |

(56) References Cited

U.S. PATENT DOCUMENTS

| | | | |
|---|---|---|---|
| 2006/0233155 A1 | 10/2006 | Srivastava | |
| 2006/0253546 A1 | 11/2006 | Chang et al. | |
| 2006/0253609 A1 | 11/2006 | Andreev et al. | |
| 2006/0259581 A1 | 11/2006 | Piersol | |
| 2006/0259690 A1 | 11/2006 | Vittal et al. | |
| 2006/0259984 A1 | 11/2006 | Juneau | |
| 2006/0265497 A1 | 11/2006 | Ohata et al. | |
| 2006/0265508 A1 | 11/2006 | Angel et al. | |
| 2006/0265516 A1 | 11/2006 | Schilling | |
| 2006/0265720 A1 | 11/2006 | Cai et al. | |
| 2006/0271641 A1 | 11/2006 | Stavrakos et al. | |
| 2006/0282522 A1 | 12/2006 | Lewin et al. | |
| 2007/0005689 A1 | 1/2007 | Leighton et al. | |
| 2007/0005892 A1 | 1/2007 | Mullender et al. | |
| 2007/0011267 A1 | 1/2007 | Overton et al. | |
| 2007/0014241 A1 | 1/2007 | Banerjee et al. | |
| 2007/0021998 A1 | 1/2007 | Laithwaite et al. | |
| 2007/0038729 A1 | 2/2007 | Sullivan et al. | |
| 2007/0038994 A1 | 2/2007 | Davis et al. | |
| 2007/0041393 A1 | 2/2007 | Westhead et al. | |
| 2007/0043859 A1 | 2/2007 | Ruul | |
| 2007/0050522 A1 | 3/2007 | Grove et al. | |
| 2007/0050703 A1 | 3/2007 | Lebel | |
| 2007/0055764 A1 | 3/2007 | Dilley et al. | |
| 2007/0061440 A1 | 3/2007 | Sundaram et al. | |
| 2007/0076872 A1 | 4/2007 | Juneau | |
| 2007/0086429 A1 | 4/2007 | Lawrence et al. | |
| 2007/0094361 A1 | 4/2007 | Hoynowski et al. | |
| 2007/0101377 A1 | 5/2007 | Six et al. | |
| 2007/0118667 A1 | 5/2007 | McCarthy et al. | |
| 2007/0118668 A1 | 5/2007 | McCarthy et al. | |
| 2007/0134641 A1 | 6/2007 | Lieu | |
| 2007/0168517 A1 | 7/2007 | Weller et al. | |
| 2007/0174426 A1 | 7/2007 | Swildens et al. | |
| 2007/0174442 A1 | 7/2007 | Sherman et al. | |
| 2007/0174490 A1 | 7/2007 | Choi et al. | |
| 2007/0183342 A1 | 8/2007 | Wong et al. | |
| 2007/0198982 A1 | 8/2007 | Bolan et al. | |
| 2007/0204107 A1 | 8/2007 | Greenfield et al. | |
| 2007/0208737 A1 | 9/2007 | Li et al. | |
| 2007/0219795 A1 | 9/2007 | Park et al. | |
| 2007/0220010 A1 | 9/2007 | Ertugrul | |
| 2007/0233705 A1 | 10/2007 | Farber et al. | |
| 2007/0233706 A1 | 10/2007 | Farber et al. | |
| 2007/0233846 A1 | 10/2007 | Farber et al. | |
| 2007/0233884 A1 | 10/2007 | Farber et al. | |
| 2007/0244964 A1 | 10/2007 | Challenger et al. | |
| 2007/0250467 A1 | 10/2007 | Mesnik et al. | |
| 2007/0250560 A1 | 10/2007 | Wein et al. | |
| 2007/0250601 A1 | 10/2007 | Amlekar et al. | |
| 2007/0250611 A1 | 10/2007 | Bhogal et al. | |
| 2007/0253377 A1 | 11/2007 | Janneteau et al. | |
| 2007/0255843 A1 | 11/2007 | Zubev | |
| 2007/0263604 A1 | 11/2007 | Tai | |
| 2007/0266113 A1 | 11/2007 | Koopmans et al. | |
| 2007/0266311 A1 | 11/2007 | Westphal | |
| 2007/0266333 A1 | 11/2007 | Cossey et al. | |
| 2007/0270165 A1* | 11/2007 | Poosala | 455/456.3 |
| 2007/0271375 A1 | 11/2007 | Hwang | |
| 2007/0271385 A1 | 11/2007 | Davis et al. | |
| 2007/0280229 A1 | 12/2007 | Kenney | |
| 2007/0288588 A1 | 12/2007 | Wein et al. | |
| 2008/0005057 A1 | 1/2008 | Ozzie et al. | |
| 2008/0008089 A1 | 1/2008 | Bornstein et al. | |
| 2008/0025304 A1 | 1/2008 | Venkataswami et al. | |
| 2008/0037536 A1 | 2/2008 | Padmanabhan et al. | |
| 2008/0046596 A1 | 2/2008 | Afergan et al. | |
| 2008/0065724 A1 | 3/2008 | Seed et al. | |
| 2008/0065745 A1 | 3/2008 | Leighton et al. | |
| 2008/0071859 A1 | 3/2008 | Seed et al. | |
| 2008/0071987 A1 | 3/2008 | Karn et al. | |
| 2008/0072264 A1 | 3/2008 | Crayford | |
| 2008/0082551 A1 | 4/2008 | Farber et al. | |
| 2008/0086574 A1 | 4/2008 | Raciborski et al. | |
| 2008/0103805 A1 | 5/2008 | Shear et al. | |
| 2008/0104268 A1 | 5/2008 | Farber et al. | |
| 2008/0114829 A1 | 5/2008 | Button et al. | |
| 2008/0134043 A1 | 6/2008 | Georgis et al. | |
| 2008/0140800 A1 | 6/2008 | Farber et al. | |
| 2008/0147866 A1 | 6/2008 | Stolorz et al. | |
| 2008/0147873 A1 | 6/2008 | Matsumoto | |
| 2008/0155061 A1 | 6/2008 | Afergan et al. | |
| 2008/0155614 A1 | 6/2008 | Cooper et al. | |
| 2008/0162667 A1 | 7/2008 | Verma et al. | |
| 2008/0162821 A1 | 7/2008 | Duran et al. | |
| 2008/0172488 A1 | 7/2008 | Jawahar et al. | |
| 2008/0189437 A1 | 8/2008 | Halley | |
| 2008/0201332 A1 | 8/2008 | Souders et al. | |
| 2008/0215718 A1 | 9/2008 | Stolorz et al. | |
| 2008/0215730 A1 | 9/2008 | Sundaram et al. | |
| 2008/0215735 A1 | 9/2008 | Farber et al. | |
| 2008/0215750 A1 | 9/2008 | Farber et al. | |
| 2008/0215755 A1 | 9/2008 | Farber et al. | |
| 2008/0222281 A1 | 9/2008 | Dilley et al. | |
| 2008/0222291 A1 | 9/2008 | Weller et al. | |
| 2008/0222295 A1 | 9/2008 | Robinson et al. | |
| 2008/0228574 A1 | 9/2008 | Stewart et al. | |
| 2008/0228920 A1 | 9/2008 | Souders et al. | |
| 2008/0235400 A1 | 9/2008 | Slocombe et al. | |
| 2008/0256175 A1 | 10/2008 | Lee et al. | |
| 2008/0275772 A1 | 11/2008 | Suryanarayana et al. | |
| 2008/0281946 A1 | 11/2008 | Swildens et al. | |
| 2008/0281950 A1 | 11/2008 | Wald et al. | |
| 2008/0288722 A1 | 11/2008 | Lecoq et al. | |
| 2008/0301670 A1 | 12/2008 | Gouge et al. | |
| 2008/0319862 A1 | 12/2008 | Golan et al. | |
| 2009/0013063 A1 | 1/2009 | Soman | |
| 2009/0016236 A1 | 1/2009 | Alcala et al. | |
| 2009/0029644 A1 | 1/2009 | Sue et al. | |
| 2009/0031367 A1 | 1/2009 | Sue | |
| 2009/0031368 A1 | 1/2009 | Ling | |
| 2009/0031376 A1 | 1/2009 | Riley et al. | |
| 2009/0049098 A1 | 2/2009 | Pickelsimer et al. | |
| 2009/0063704 A1 | 3/2009 | Taylor et al. | |
| 2009/0070533 A1 | 3/2009 | Elazary et al. | |
| 2009/0083228 A1 | 3/2009 | Shatz et al. | |
| 2009/0086741 A1 | 4/2009 | Zhang | |
| 2009/0103707 A1 | 4/2009 | McGary et al. | |
| 2009/0106381 A1 | 4/2009 | Kasriel et al. | |
| 2009/0112703 A1 | 4/2009 | Brown | |
| 2009/0125934 A1 | 5/2009 | Jones et al. | |
| 2009/0132368 A1 | 5/2009 | Cotter et al. | |
| 2009/0132648 A1 | 5/2009 | Swildens et al. | |
| 2009/0144412 A1 | 6/2009 | Ferguson et al. | |
| 2009/0150926 A1 | 6/2009 | Schlack | |
| 2009/0157850 A1 | 6/2009 | Gagliardi et al. | |
| 2009/0158163 A1 | 6/2009 | Stephens et al. | |
| 2009/0164331 A1 | 6/2009 | Bishop et al. | |
| 2009/0177667 A1 | 7/2009 | Ramos et al. | |
| 2009/0182815 A1 | 7/2009 | Czechowski et al. | |
| 2009/0182945 A1 | 7/2009 | Aviles et al. | |
| 2009/0187575 A1 | 7/2009 | Dacosta | |
| 2009/0204682 A1 | 8/2009 | Jeyaseelan et al. | |
| 2009/0210549 A1 | 8/2009 | Hudson et al. | |
| 2009/0233623 A1* | 9/2009 | Johnson | 455/456.3 |
| 2009/0248786 A1* | 10/2009 | Richardson et al. | 709/201 |
| 2009/0248852 A1 | 10/2009 | Fuhrmann et al. | |
| 2009/0248893 A1 | 10/2009 | Richardson et al. | |
| 2009/0249222 A1 | 10/2009 | Schmidt et al. | |
| 2009/0259971 A1 | 10/2009 | Rankine et al. | |
| 2009/0271577 A1 | 10/2009 | Campana et al. | |
| 2009/0271730 A1 | 10/2009 | Rose et al. | |
| 2009/0279444 A1 | 11/2009 | Ravindran et al. | |
| 2009/0287750 A1 | 11/2009 | Banavar et al. | |
| 2009/0307307 A1 | 12/2009 | Igarashi | |
| 2009/0327489 A1 | 12/2009 | Swildens et al. | |
| 2009/0327517 A1 | 12/2009 | Sivasubramanian et al. | |
| 2009/0327914 A1 | 12/2009 | Adar et al. | |
| 2010/0005175 A1 | 1/2010 | Swildens et al. | |
| 2010/0011061 A1 | 1/2010 | Hudson et al. | |
| 2010/0011126 A1 | 1/2010 | Hsu et al. | |
| 2010/0023601 A1 | 1/2010 | Lewin et al. | |
| 2010/0030662 A1 | 2/2010 | Klein | |
| 2010/0030914 A1* | 2/2010 | Sparks et al. | 709/235 |

(56) References Cited

U.S. PATENT DOCUMENTS

| | | | |
|---|---|---|---|
| 2010/0034470 A1 | 2/2010 | Valencia-Campo et al. |
| 2010/0036944 A1 | 2/2010 | Douglis et al. |
| 2010/0057894 A1 | 3/2010 | Glasser |
| 2010/0070603 A1 | 3/2010 | Moss et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0100629 A1 | 4/2010 | Raciborski et al. |
| 2010/0111059 A1 | 5/2010 | Bappu et al. |
| 2010/0115133 A1 | 5/2010 | Joshi |
| 2010/0121953 A1 | 5/2010 | Friedman et al. |
| 2010/0121981 A1 | 5/2010 | Drako |
| 2010/0122069 A1 | 5/2010 | Gonion |
| 2010/0125673 A1* | 5/2010 | Richardson et al. ......... 709/239 |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0192225 A1 | 7/2010 | Ma et al. |
| 2010/0217801 A1 | 8/2010 | Leighton et al. |
| 2010/0226372 A1 | 9/2010 | Watanabe |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0332595 A1 | 12/2010 | Fullagar et al. |
| 2011/0029598 A1 | 2/2011 | Arnold et al. |
| 2011/0040893 A1 | 2/2011 | Karaoguz et al. |
| 2011/0078000 A1 | 3/2011 | Ma et al. |
| 2011/0078230 A1 | 3/2011 | Sepulveda |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153941 A1 | 6/2011 | Spatscheck et al. |
| 2011/0191449 A1 | 8/2011 | Swildens et al. |
| 2011/0191459 A1 | 8/2011 | Joshi |
| 2011/0219120 A1 | 9/2011 | Farber et al. |
| 2011/0219372 A1 | 9/2011 | Agrawal et al. |
| 2011/0238501 A1 | 9/2011 | Almeida |
| 2011/0238793 A1 | 9/2011 | Bedare et al. |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2012/0036238 A1 | 2/2012 | Sundaram et al. |
| 2012/0066360 A1 | 3/2012 | Ghosh |
| 2012/0124184 A1 | 5/2012 | Sakata et al. |
| 2012/0131177 A1 | 5/2012 | Brandt et al. |
| 2012/0166516 A1 | 6/2012 | Simmons et al. |
| 2012/0169646 A1 | 7/2012 | Berkes et al. |
| 2012/0179839 A1 | 7/2012 | Raciborski et al. |
| 2012/0198043 A1 | 8/2012 | Hesketh et al. |
| 2012/0233522 A1 | 9/2012 | Barton et al. |
| 2012/0233668 A1 | 9/2012 | Leafe et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0041872 A1 | 2/2013 | Aizman et al. |
| 2013/0086001 A1 | 4/2013 | Bhogal et al. |
| 2013/0130221 A1 | 5/2013 | Kortemeyer et al. |
| 2013/0198341 A1 | 8/2013 | Kim |
| 2013/0212300 A1 | 8/2013 | Eggleston et al. |
| 2013/0227165 A1 | 8/2013 | Liu |
| 2013/0246567 A1 | 9/2013 | Green et al. |
| 2013/0268616 A1 | 10/2013 | Sakata et al. |
| 2013/0318153 A1 | 11/2013 | Sivasubramanian et al. |
| 2013/0339429 A1 | 12/2013 | Richardson et al. |
| 2013/0346567 A1 | 12/2013 | Richardson et al. |
| 2014/0040478 A1 | 2/2014 | Hsu et al. |
| 2014/0075109 A1 | 3/2014 | Richardson et al. |
| 2014/0143320 A1 | 5/2014 | Sivasubramanian et al. |
| 2014/0257891 A1 | 9/2014 | Richardson et al. |
| 2014/0325155 A1 | 10/2014 | Marshall et al. |
| 2014/0365666 A1 | 12/2014 | Richardson et al. |

FOREIGN PATENT DOCUMENTS

| | | | |
|---|---|---|---|
| CN | 101189598 A | | 5/2008 |
| CN | 101460907 A | | 6/2009 |
| EP | 2008167 A2 | | 12/2008 |
| JP | 2001-0506093 | | 5/2001 |
| JP | 2002-044137 | | 2/2002 |
| JP | 2003-167810 A | | 6/2003 |
| JP | 2003-167813 A | | 6/2003 |
| JP | 2003-522358 A | | 7/2003 |
| JP | 2004-533738 A | | 11/2004 |
| JP | 2005-537687 | | 12/2005 |
| JP | 2007-133896 A | | 5/2007 |
| JP | 2009-071538 A | | 4/2009 |
| JP | 2012-209623 A | | 10/2012 |
| WO | WO 02/069608 A2 | | 9/2002 |
| WO | WO 2007/007960 A1 | | 1/2007 |
| WO | WO 2007/126837 A3 | | 11/2007 |
| WO | WO 2010/002603 A1 | | 1/2010 |
| WO | WO 2012/044587 | | 4/2012 |

OTHER PUBLICATIONS

"Content delivery network", Wikipedia, the free encyclopedia, Retrieved from the Internet: URL:http://en.wikipedia.org/w/index.php?title=Contentdelivery network&oldid=6010099 70, XP055153445, Mar. 24, 2008.

"Global Server Load Balancing with Serverlron," Foundry Networks, retrieved Aug. 30, 2007, from http://www.foundrynet.com/pdf/an-global-server-load-bal.pdf, 7 pages.

"Grid Computing Solutions," Sun Microsystems, Inc., retrieved May 3, 2006, from http://www.sun.com/software/grid, 3 pages.

"Grid Offerings," Java.net, retrieved May 3, 2006, from http://wiki.java.net/bin/view/Sungrid/OtherGridOfferings, 8 pages.

"Recent Advances Boost System Virtualization," eWeek.com, retrieved from May 3, 2006, http://www.eWeek.com/article2/0,1895,1772626,00.asp, 5 pages.

"Scaleable Trust of Next Generation Management (STRONGMAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3 .xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Softricity Desktop," Softricity, Inc., retrieved May 3, 2006, from http://www.softricity.com/products/, 3 pages.

"Xen—The Xen virtual Machine Monitor," University of Cambridge Computer Laboratory, retrieved Nov. 8, 2005, from http://www.cl.cam.ac.uk/Research/SRG/netos/xen/, 2 pages.

"XenFaq," retrieved Nov. 8, 2005, from http://wiki.xensource.com/xenwiki/XenFaq?action=print, 9 pages.

Abi, Issam, et al., "A Business Driven Management Framework for Utility Computing Environments," Oct. 12, 2004, HP Laboratories

(56) References Cited

OTHER PUBLICATIONS

Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls," ;login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It? —Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes", Dec. 18, 2004, Technical University Berlin, all pages.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kenshi, P., "Help File Library: Iptables Basics," Justlinux, retrieved Dec. 1, 2005, from http://www.justlinux.com/nhf/Security/Iptables_Basics.html, 4 pages.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb., 2005.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on The Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117,15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al', "Decision tree regression for soft classification of remote sensing data", Remote Sensing of Environment 97 (2005) pp. 322-336.
Yamagata, et al., "A virtual-machine based fast deployment tool for Grid execution environment, " Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
First Singapore Written Opinion in Application No. 201006836-9, dated Oct. 12, 2011 (SEAZN.194VSG) in 12 pages.
Singapore Written Opinion in Application No. 201006836-9, dated Apr. 30, 2012 (SEAZN.194VSG) in 10 pages.
First Office Action in Chinese Application No. 200980111422.3 dated Apr. 13, 2012 (SEAZN.194VCN).
First Office Action in Japanese Application No. 2011-502138 dated Feb. 1, 2013 (SEAZN.194VJP).
Singapore Written Opinion in Application No. 201006837-7, mailed Oct. 12, 2011 (SEAZN.197VSG) in 11 pages.
Supplementary European Search Report in Application No. 09727694.3 mailed Jan. 30, 2012 (SEAZN.197VEP) in 6 pages.
Singapore Examination Report in Application No. 201006837-7 mailed Mar. 16, 2012 (SEAZN.197VSG).
First Office Action in Chinese Application No. 200980111426.1 mailed Feb. 16, 2013 (SEAZN.197VCN).
Second Office Action in Chinese Application No. 200980111426.1 mailed Dec. 25, 2013 (SEAZN.197VCN).
Third Office Action in Chinese Application No. 200980111426.1 mailed Jul. 7, 2014 (SEAZN.197VCN).
First Office Action in Japanese Application No. 2011-502139 dated Nov. 5, 2013 (SEAZN.197VJP).
Decision of Rejection in Application No. 2011-502139 dated Jun. 30, 2014 (SEAZN.197VJP).
Singapore Written Opinion in Application No. 201006874-0, mailed Oct. 12, 2011 (SEAZN.207VSG) in 10 pages.
First Office Action in Japanese Application No. 2011-502140 mailed Dec. 7, 2012 (SEAZN.207VJP).
First Office Action in Chinese Application No. 200980119995.0 dated Jul. 6, 2012 (SEAZN.207VCN).

(56) References Cited

OTHER PUBLICATIONS

Second Office Action in Chinese Application No. 200980119995.0 dated Apr. 15, 2013 (SEAZN.207VCN).
Examination Report in Singapore Application No. 201006874-0 dated May 16, 2012 (SEAZN.207VSG).
Supplementary European Search Report in Application No. 09728756.9 mailed Jan. 8, 2013 (SEAZN.209VEP).
First Office Action in Chinese Application No. 200980119993.1 dated Jul. 4, 2012 (SEAZN.209VCN).
Second Office Action in Chinese Application No. 200980119993.1 dated Mar. 12, 2013 (SEAZN.209VCN).
Third Office Action in Chinese Application No. 200980119993.1 dated Oct. 21, 2013.
First Office Action in Japanese Application No. 2011-503091 dated Nov. 18, 2013.
Search Report and Written Opinion issued in Singapore Application No. 201006873-2 mailed on Oct. 12, 2011.
First Office Action is Chinese Application No. 200980125551.8 mailed Jul. 4, 2012.
First Office Action in Japanese Application No. 2011-516466 mailed Mar. 6, 2013.
Second Office Action in Japanese Application No. 2011-516466 mailed Mar. 17, 2014.
Office Action in Canadian Application No. 2726915 dated May 13, 2013.
First Office Action in Korean Application No. Oct. 2011-7002461 mailed May 29, 2013.
First Office Action in Chinese Application No. 200980145872.4 dated Nov. 29, 2012.
Preliminary Examination in Chinese Application No. 201310717573.1 dated Feb. 25, 2014. English Translation Not Yet Received.
Office Action in Canadian Application No. 2741895 dated Feb. 25, 2013.
Office Action in Canadian Application No. 2741895 dated Oct. 21, 2013.
Search Report and Written Opinion in Singapore Application No. 201103333-9 mailed Nov. 19, 2012.
Examination Report in Singapore Application No. 201103333-9 dated Aug. 13, 2013.
International Search Report and Written Opinion in PCT/US2011/053302 mailed Nov. 28, 2011 in 11 pages.
International Preliminary Report on Patentability in PCT/US2011/053302 mailed Apr. 2, 2013.
First Office Action in Japanese Application No. 2013-529454 mailed Feb. 3, 2014 in 6 pages.
First Office Action issued in Australian Application No. 2011307319 mailed Mar. 6, 2014 in 5 pages.
Search Report and Written Opinion in Singapore Application No. 201301573-0 mailed Jul. 1, 2014.
First Office Action in Chinese Application No. 201180046104.0 mailed Nov. 3, 2014.
International Preliminary Report on Patentability in PCT/US2011/061486 mailed May 22, 2013.
International Search Report and Written Opinion in PCT/US2011/061486 mailed Mar. 30, 2012 in 11 pages.
Preliminary Examination in Chinese Application No. 201180053405.6 dated May 28, 2013. English Translation Not Yet Received.
Office Action in Japanese Application No. 2013-540982 dated Jun. 2, 2014 English Translation Not Yet Received.
Written Opinion in Singapore Application No. 201303521-7 dated May 20, 2014.
International Search Report and Written Opinion in PCT/US07/07601 mailed Jul. 18, 2008 in 11 pages.
International Preliminary Report on Patentability in PCT/US2007/007601 mailed Sep. 30, 2008 in 8 pages.
Supplementary European Search Report in Application No. 07754164.7 mailed Dec. 20, 2010 in 7 pages.
Office Action in Chinese Application No. 200780020255.2 dated Mar. 4, 2013.
Office Action in Indian Application No. 3742/Kolnp/2008 dated Nov. 22, 2013.
Office Action in Japanese Application No. 2012-052264 mailed Dec. 11, 2012 in 26 pages.
Office Action in Japanese Application No. 2013-123086 mailed Apr. 15, 2014 in 3 pages.

* cited by examiner

MANAGING REQUEST ROUTING INFORMATION UTILIZING PERFORMANCE INFORMATION

CROSS-REFERENCE TO RELATED APPLICATIONS

This application claims the benefit of U.S. Provisional Patent Application No. 61/613,921, entitled MANAGING REQUEST ROUTING INFORMATION UTILIZING PERFORMANCE INFORMATION, and filed Mar. 21, 2012, the entirety of which is incorporated by reference herein.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages or resources identified in Web pages, through the utilization of a content delivery network ("CDN") service provider. A CDN service provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to managing requesting routing functionality associated with resource requests for one or more resources associated with a content provider. Specifically, aspects of the disclosure will be described with regard to the management and processing request routing functionality by a service provider, such as a domain name service ("DNS") service provider or a content delivery network ("CDN") service provider, on behalf of a content provider.

Illustratively, in one embodiment, the request routing functionality can correspond to the processing of DNS requests for resources by computing devices and the resolution of the DNS requests by the identification of a network address of a computing device that will provide the requested resources. Based on the processing of DNS queries initiated by a client computing devices from networks, a service provider can correlate performance information for the network. In one embodiment, the performance information may be obtained by the same service provider. For example, a CDN service provider may collect performance information that is used by the same CDN service provider. In another embodiment, the performance information may be obtained by a service provider different from the service provider utilizing the collected performance information. For example, a CDN service provider may facilitate that collection of performance information that is then provided to a DNS service provider. The service provider (e.g., a CND service provider or DNS service provider) can then utilize the correlated CDN performance information to process subsequent resource requests.

Although various aspects of the disclosure will be described with regard to illustrative examples and embodiments, one skilled in the art will appreciate that the disclosed embodiments and examples should not be construed as limiting. For example, the present disclosure may be described with regard to request routing services provided by a service provider, such as a CDN service provider or DNS service provider, that may or may not provide additional services and functionality including network-based storage services, caching services, application hosting, or other services. Accordingly, use of the term "service provider" is not intended to be limited to any particular type of service provider, whether discussed or described in examples. Accordingly, one skilled in the relevant art will appreciate that a service provider need not provide all, or any, of the additional services or functionality that may be associated with some service providers, such as a CDN service provider.

Figure 1:
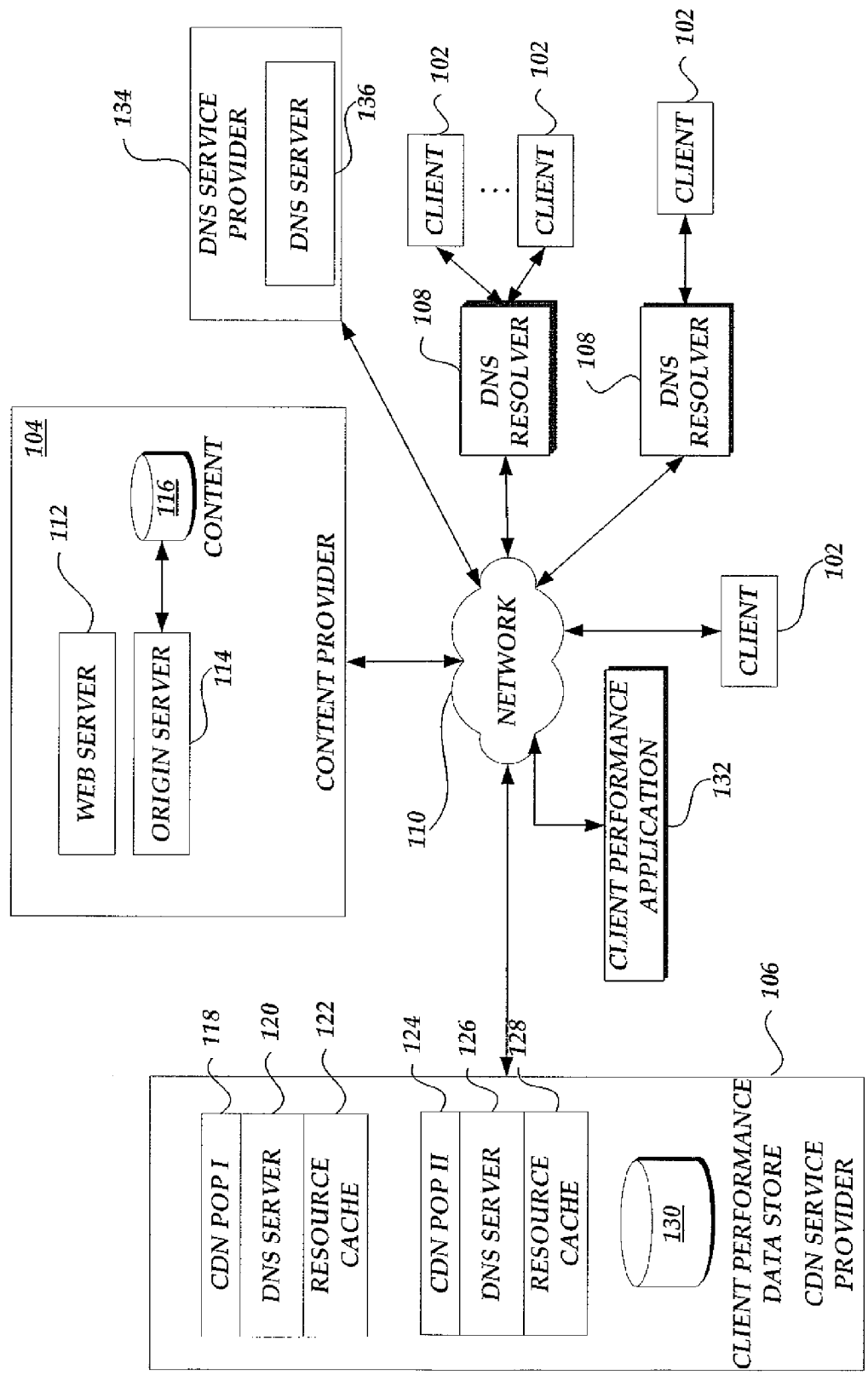
FIG. 1 is a block diagram illustrative of content delivery environment including a number of client computing devices, a content provider, and a content delivery network service provider.

FIG. 1 is a block diagram illustrative of content delivery environment 100 for the managing registration of content provider with a service provider, such as a CDN service provider, and subsequent processing of at least a portion of content requests on behalf of the content provider. As illustrated in FIG. 1, the content delivery environment 100 includes a number of client computing devices 102 (generally referred to as clients) for requesting content from a content provider, a network storage provider 110, or a CDN service provider 106. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Illustratively, at least some of the client computing devices 102 utilize a DNS resolver component 108, such as a DNS Name server, that receives DNS queries from a client computing device 102 and then generates the DNS queries attributed to the client computing device, or on behalf of the client computing device. In one embodiment, the DNS resolver component 108 may be a local DNS component provided by an enterprise network to which the client computing device 102 belongs. In another embodiment, the local DNS resolver component 108 may be provided by an Internet Service Provider ("ISP") that provides the communication network connection to the client computing device 102. In embodiments in which the client computing devices 102 utilize a DNS resolver component 108, one skilled in the relevant art will appreciate that the DNS queries generated on behalf of the client computing devices would be associated with the IP address of the DNS resolver component 108 in accordance with a traditional networking protocols.

The content delivery environment 100 can also include a content provider 104 in communication with the one or more client computing devices 102 via the communication network 110. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources and the like. Additionally, although the origin server component 114 and associated storage component 116 are logically associated with the content provider 104, the origin server component 114 and associated storage components 116 may be geographically distributed throughout the communication network 108 in a manner to best serve various demographics of client computing devices 102.

Although not illustrated in FIG. 1, the content provider 104 can be associated with a number of additional or supplement components to facilitate interaction with client computing devices 102 or service providers. For example, a content provider 104 may maintain one or more DNS name server components that are operative to receive DNS queries related to registered domain names associated with the content provider 104. The one or more DNS name servers can be authoritative to resolve client computing device DNS queries corresponding to the registered domain names of the content provider 104. The content provider 104 can also maintain additional storage components, such as proxy servers, or utilize network storage service providers to maintain at least a portion of the content/resources provided to the client computing devices 102.

With continued reference to FIG. 1, the content delivery environment 100 can further include a service provider, generally referred to as the CDN service provider 106, in communication with the one or more client computing devices 102 and the content provider 104 via the communication network 110. The CDN service provider 106 illustrated in FIG. 1 corresponds to a logical association of one or more computing devices associated with a service provider. Specifically, the CDN service provider 106 can include a number of Point of Presence ("POP") locations 118, 124 that correspond to nodes on the communication network 110. Each POP 118, 124 includes a DNS component 120, 126 made up of a number of DNS server computing devices for resolving DNS queries from the client computers 102. Each POP 118, 124 also optionally includes a resource cache component 122, 128 made up of a number of cache server computing devices for storing resources from content providers or network storage providers and transmitting various requested resources to various client computers 102. The DNS components 120, 126 and the resource cache components 122, 128 may further include additional software and/or hardware components that facilitate communications including, but not limited, load balancing or load sharing software/hardware components.

Still further, the CDN service provider 106 can include additional data stores for managing requesting routing information. Specifically, in an illustrative embodiment, the CDN service provider 106 can include a client performance data store 130 for maintaining information correlating performance information between client computing device 102 identifiers and various components associated with the CDN service provider 106. Although the client performance data store 130 is illustrated as single, centrally located data stores, one skilled in the relevant art will appreciate that the data store may be distributed among several data stores or be maintained, at least in part, among the POPs 118, 124.

The content delivery environment can further include a performance processing application 132 for processing the collected performance information and correlating the performance information. Illustratively, the performance processing application 132 can utilize the processed performance information to generated prioritized request routing processing information for at least a subset of DNS server components. Although the performance processing application 132 is illustrated as a single application, one skilled in the relevant art will appreciate that the performance processing application 132 may be implemented in a distributed manner. Additionally, the DNS performance processing application 132 may be implemented as a stand-alone service hosted on a computing device or in a virtualized environment. Still further, the performance processing application 132 can also be implemented as part of a CDN service provider 106 or other service provider, such as a DNS service provider.

In an illustrative embodiment, the DNS component 120, 126 and resource cache component 122, 128 are considered to be logically grouped, regardless of whether the components, or portions of the components, are physically separate. Additionally, although the POPs 118, 124 are illustrated in FIG. 1 as logically associated with the CDN service provider 106, the POPs will be geographically distributed throughout the communication network 110 in a manner to best serve various demographics of client computing devices 102. Additionally, one skilled in the relevant art will appreciate that the CDN service provider 106 can be associated with various additional computing resources, such additional computing devices for administration of content and resources, and the like. Even further, the components of the CDN service provider 106 can be managed by the same or different entities. One skilled in the relevant art will also appreciate that the components and configurations provided in FIG. 1 are illustrative in nature. Accordingly, additional or alternative components and/or configurations, especially regarding the additional components, systems and subsystems for facilitating communications may be utilized.

With continued reference to FIG. 1, the content delivery environment 100 can further include a different service provider, generally referred to as the DNS service provider 136, in communication with the one or more client computing devices 102, the content provider 104, and the CDN service provider 106 via the communication network 110. The DNS service provider 136 illustrated in FIG. 1 corresponds to a logical association of one or more computing devices associated with a service provider. Specifically, the DNS service provider 136 can include one or more DNS components 138 made up of a number of DNS server computing devices for resolving DNS queries from the client computers 102. Illustratively, the DNS service provider 136 would not necessarily include any additional functionality and may provide DNS request routing service in lieu of any DNS request routing functionality provided by another service provider, such as a DNS service provider 106.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
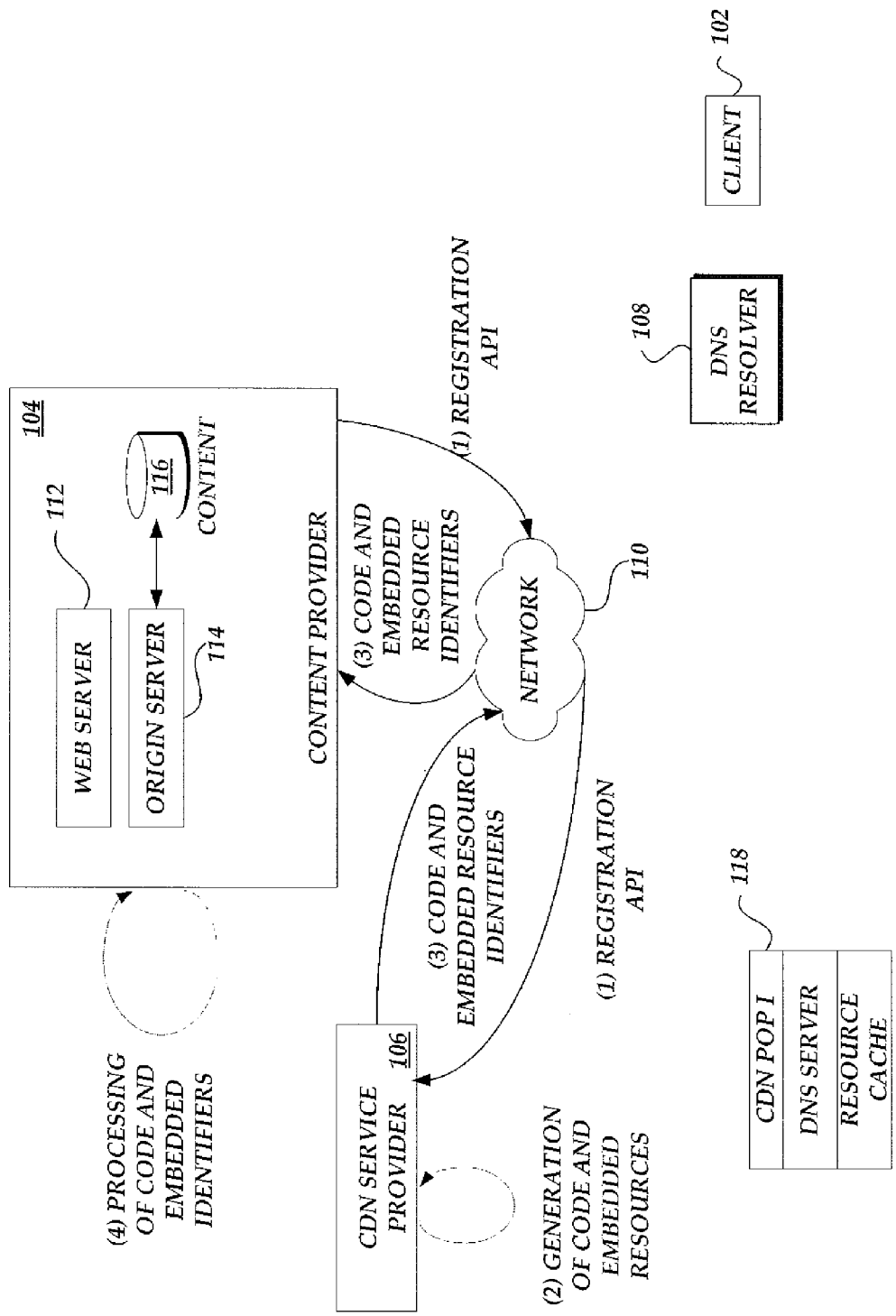
FIG. 2 is a block diagram of the content delivery environment of FIG. 1 illustrating the registration of a content provider with a CDN service provider.

With reference to FIG. 2, an illustrative interaction for the optional registration of a content provider 104 with the CDN service provider 106 for hosting content on behalf of the content provider 104 will be described. As illustrated in FIG. 2, the CDN service provider content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104, or at least perform the processes described herein. Illustratively, the registration API can include the identification of the origin server 114 of the content provider 104 that may provide requested resources to the CDN service provider 106. In addition or alternatively, the registration API can include the content to be stored by the CDN service provider 106 on behalf of the content provider 104. Additionally, the content provider 104 can specify one or more network storage providers (not illustrated) that may act as an origin server for the content provider 104.

With continued reference to FIG. 2, upon receiving the registration API, the CDN service provider 106 obtains the registration information and generates, or otherwise obtains, executable code and embedded resource identifiers that will be utilized in the collection of performance information. In an illustrative embodiment, and as will be explained in greater detail below, the executable code and embedded resource identifiers correspond to data or instructions that are processed by the client computing devices 102 to cause the client computing devices 102 to request specific resources from the CDN service provider 106. The request for specific resources from the CDN service provider 106 will result in the collection of performance information associated with processing resource requests. As will be explained in greater detail below, the collected performance information will be correlated with identifiers and utilized to generate prioritized lists for resolving subsequent DNS queries. Illustratively, the requesting of content corresponding to the embedded resource identifier provided by the CDN service provider 106 may not result in the transmittal of actual content by the CDN service provider 106.

The CDN service provider 106 returns the executable code and embedded resource identifiers to the content provider 104 along with any additional information. In turn, the content provider 104 can then store the executable code and embedded resource identifiers for embedding in requested content or otherwise embed (or associate) the embedded resource identifiers with requested content (such as Web page markup language). In an illustrative embodiment, the executable code and embedded resource identifiers can be applicable to multiple content providers 104. Alternatively, the executable code and embedded resource identifiers can be unique to each particular content provider 104. Still further, the CDN service provider 106 may provide additional logic to the content providers 104 that controls the circumstances and/or methodologies for embedding the embedded resource identifiers into content. For example, the CDN service provider 106 can include instructions (or executable code) that defines that the type of content (e.g., specific Web pages) for which the embedded resource identifiers will apply.

Figure 3:
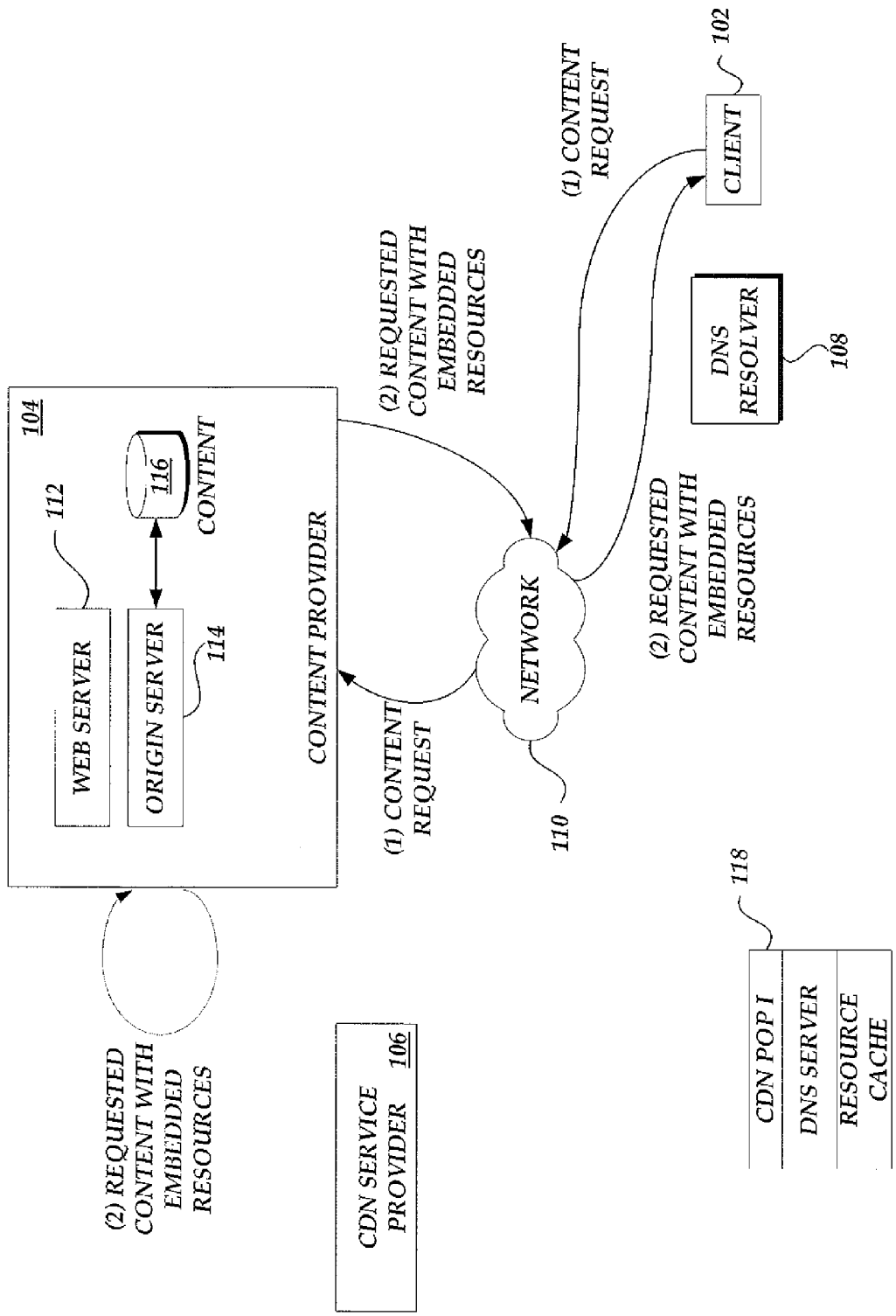
FIG. 3 is a block diagram of the content delivery environment of FIG. 1 illustrating the generation of resource requests by a client computing device.

With reference now to FIG. 3, after completion of the registration and embedding processes illustrated in FIG. 2, a client computing device 102 generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers that corresponds to resource objects that should be obtained by the client computing device 102 as part of the processing of the requested content. The embedded resources can correspond to multi-media content, such as images, videos, text, etc. that will be processed by the client computing devices 102 and rendered on output device.

Additionally, in some embodiments, the requested content will also include the additional embedded resource identifiers, instructions, executable code or logic previously provided by the CDN service provider 106 (FIG. 2). Illustratively, the additional embedded resource identifiers, instructions, executable code or logic can be utilized by the client computing device 102, content provider and CDN service provider 106 to obtaining various aspects of performance monitoring information. In an illustrative embodiment, the embedded resource identifiers, instructions, executable code or logic previously provided by the CDN service provider 106 can be arranged in a manner such that it is processed by the client computing device 102 prior to processing any other of the content in the requested content or processed in the earlier stages of the processing of the requested content, as allowed. Alternatively, the embedded resource embedded resource identifiers, instructions, executable code or logic previously provided by the CDN service provider 106 can also be arranged such that it is processed after all any other embedded resources are process so as to mitigate any type of interference or delay in the processing of other embedded resources/identifiers.

In other embodiments, one or more additional embedded resource identifiers are included in the requested resource to allow the content provider 104 to collect performance monitoring information related to the processing of requests from one or more client computing devices 102. In one aspect, one or more computing devices associated with the content provider 104 can conduct measurements or record data that measures request routing performance between the client computing devices 102, or groups of client computing device 102. In some embodiments, the computing devices can return some type of confirmation to the client computing device 102 or a specific resource. In other embodiments, the client computing device 102 may not receive any type of content, so the confirmation may include no additional content or some type of null content. The content provider 104 then measures the performance information corresponding to the processing of the resource request.

Generally, the identification of the embedded resources provided by the content provider 104 will be in the form of embedded resource identifiers that can be processed by the client computing device 102, such as through a browser software application. In an illustrative embodiment, the resource identifiers can be in the form of a uniform resource locator ("URL"). For purposes of an illustrative example, the URL can identify a domain of the content provider 104 (e.g., contentprovider.com) or CDN service provider 106 (e.g., CDNserviceprovider), a name of the resource to be requested (e.g., "resource.xxx") and a path where the resource will be found (e.g., "path"). One skilled in the relevant art will appreciate that the identified domain could correspond to third parties as well. By way of an illustrative example, the URLs of the embedded resource have the form of:

http://www.contentprovider.com/path/resource.xxx
or
http://www.CDNserviceprovider.com/path/resource.xxx Additionally, in an illustrative embodiment, the embedded resource previously provided by the CDN service provider 106 will also be in the form of a resource identifier (e.g., URLs) that can be processed by the client computing device 102, such as through a browser software application. For purposes of an illustrative example, the URL can identify a domain of the CDN service provider 106 (e.g., CDNserviceprovider.com), a name of a resource to be requested (e.g., "resource.xxx") and a path where the resource will be found (e.g., "path"). As will be explained in greater detail, the embedded resource previously provided by the CDN service provider 106 will identify a special resource such that a request for the special resource may not result in the delivery of an actual resource to the requesting client computing device 102. In this illustrative example, the URLs of the embedded resource have the form of:

http://www.CDNserviceprovider.com/path/resource.xxx

Figure 4:
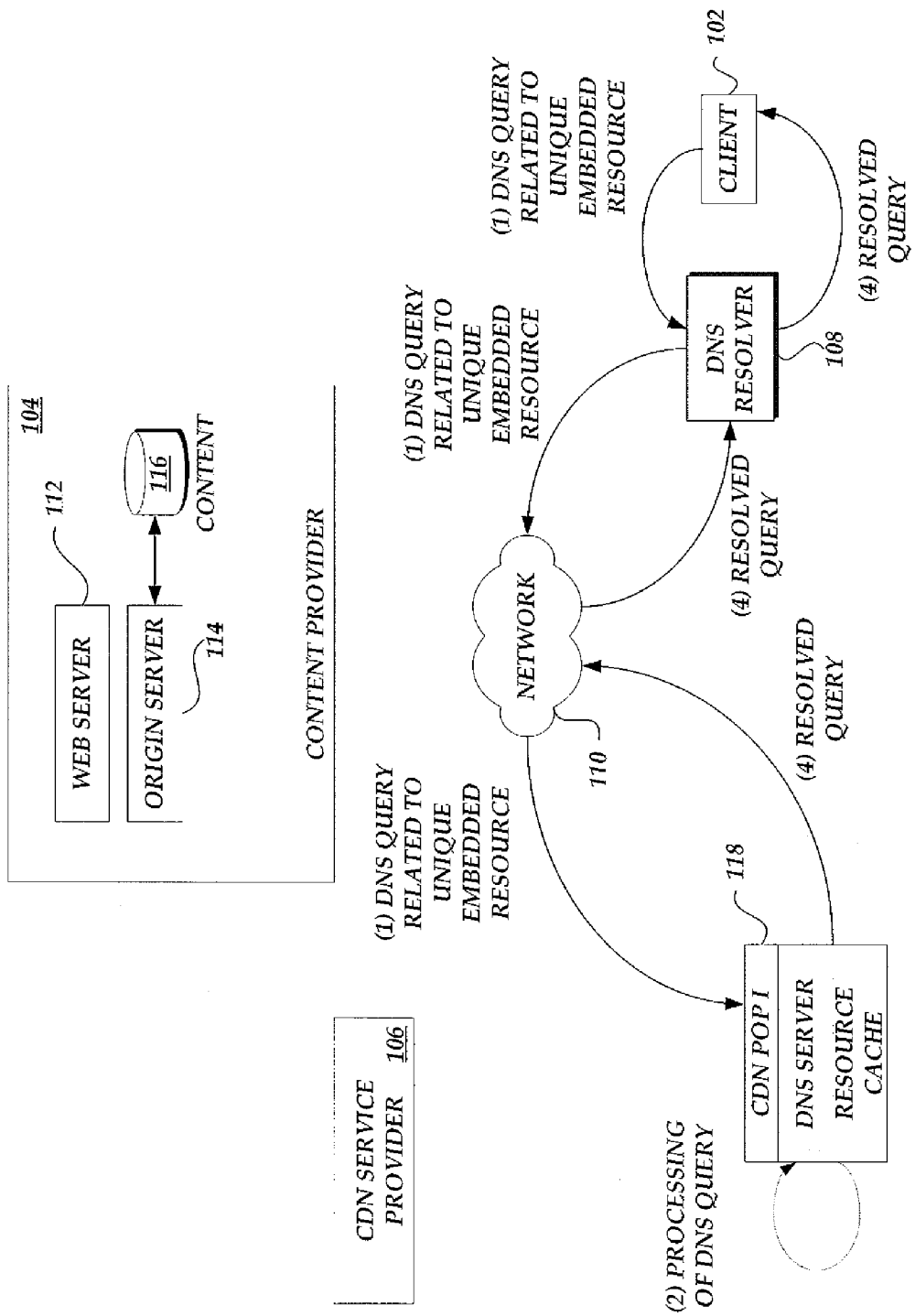
FIG. 4 is a block diagram of the content delivery environment of FIG. 1 illustrating the generation of DNS queries by a client computing device to a CDN service provider.

With reference now to FIG. 4, upon receipt of the requested content, including the embedded resource identifiers, instructions, executable code or logic previously provided by the CDN service provider 106, the client computing device 102 processes the received information in a manner that causes the client computing device 102 to request one or more embedded resources, including the embedded resource previously provided by the CDN service provider 106 from the CDN service provider 106. As illustrated in FIG. 4, in accordance with traditional communication protocols, the client computing device 102 would first transmit a DNS query through its DNS resolver 108 to request an IP address of a computing device corresponding to the unique identifier provided by the CDN service provider 106. In accordance with traditional request routing principles, the DNS query would be received by the DNS resolver 108 and then transmitted on behalf of the requesting client computing device 102.

By way of example, in accordance with traditional DNS request routing principles, a DNS query for the URL, http://www.CDNserviceprovider.com/path/resource.xxx, would first include the identification of a DNS server authoritative to the "." and the "com" portions of the URL to the DNS resolver 108. The issuance of DNS queries corresponding to the "." and the "com" portions of a URL are well known and have not been illustrated. After partially resolving the modified URL according to the "." and "com" portions of the URL, the DNS resolver 108 then issues another DNS query for the resource URL that results in the identification of the DNS server corresponding to the ".CDNserviceprovider" portion of the URL, as illustrated in FIG. 4, illustrative as the DNS server component 120 of POP 118.

The receiving DNS server component 120 obtains the DNS query from the DNS resolver component 108 and processes the query. In accordance with traditional networking principles, because the DNS server component 120 is authoritative for the URL, the DNS server component 120 provides the DNS resolver 108 with the identification of an IP address that can provide the requested content, such as a resource cache component 122 of the POP 118.

Figure 5:
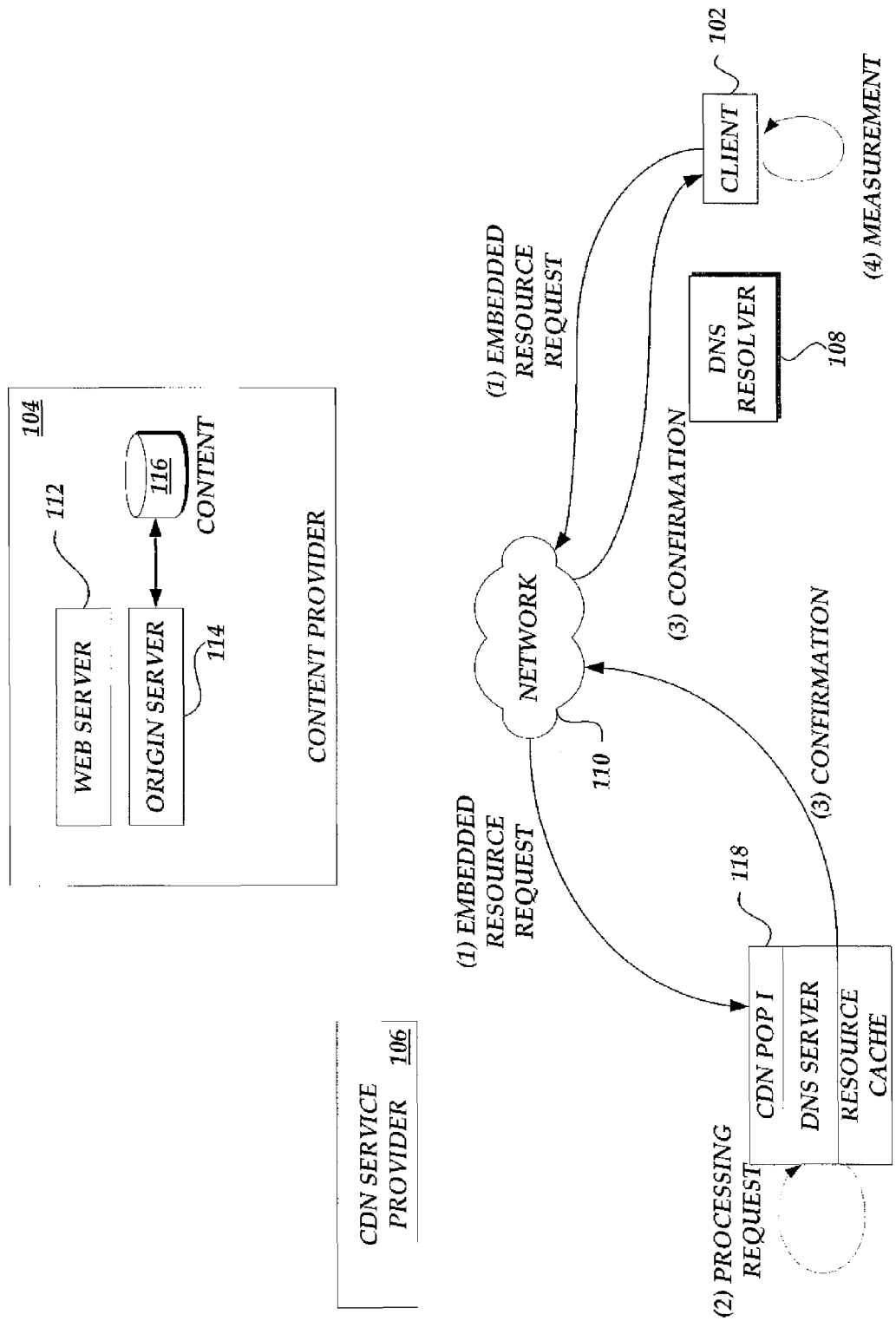
FIG. 5 is a block diagram of the content delivery environment of FIG. 1 illustrating the generation of content requests to the CDN service provider.

Turning now to FIG. 5, upon receipt of the resolved DNS query, the client computing device 102 transmits a request for the content to the IP address corresponding to a resource cache component or storage component, including the embedded resource provided by the CDN service provider 106. In accordance with an embodiment utilizing the hypertext transfer protocol ("HTTP"), the request of a resource can correspond to a GET request transmitted by the client computing device 102 to an IP address associated with CDN service provider 106. The content request is received and processed by the corresponding resource cache component 122 (FIG. 1) and storage component. In one aspect, the client computing device 102 can conduct measurements or record data that measures request routing performance between the client computing devices 102 or groups of client computing device 102 associated with particular DNS nameserver components. In some embodiments, the resource cache component 122 can return some type of confirmation to the client computing device 102 or a specific resource. As previously described, in an illustrative embodiment, the client computing device 102 may not receive any type of content, so the confirmation may include no additional content or some type of null content. The client computing device 102 then measures the performance information corresponding to the processing of the resource request by the CDN service provider 106.

In addition to the collection of performance monitoring information by the client computing devices 102, as illustrated in FIG. 5, other techniques for collecting performance information may be utilized. For example, as described above, one or more content providers 104 may be configured to measure performance based on received requests from client computing devices 102 and transmitting the requested resource. In another example, an intermediary application may obtain the initial request from the client computing device 102 and redirect the request to different POPs. In these embodiments, the client computing device 102 may not actively participate in the collection or transmittal of the performance information.

Figure 6:
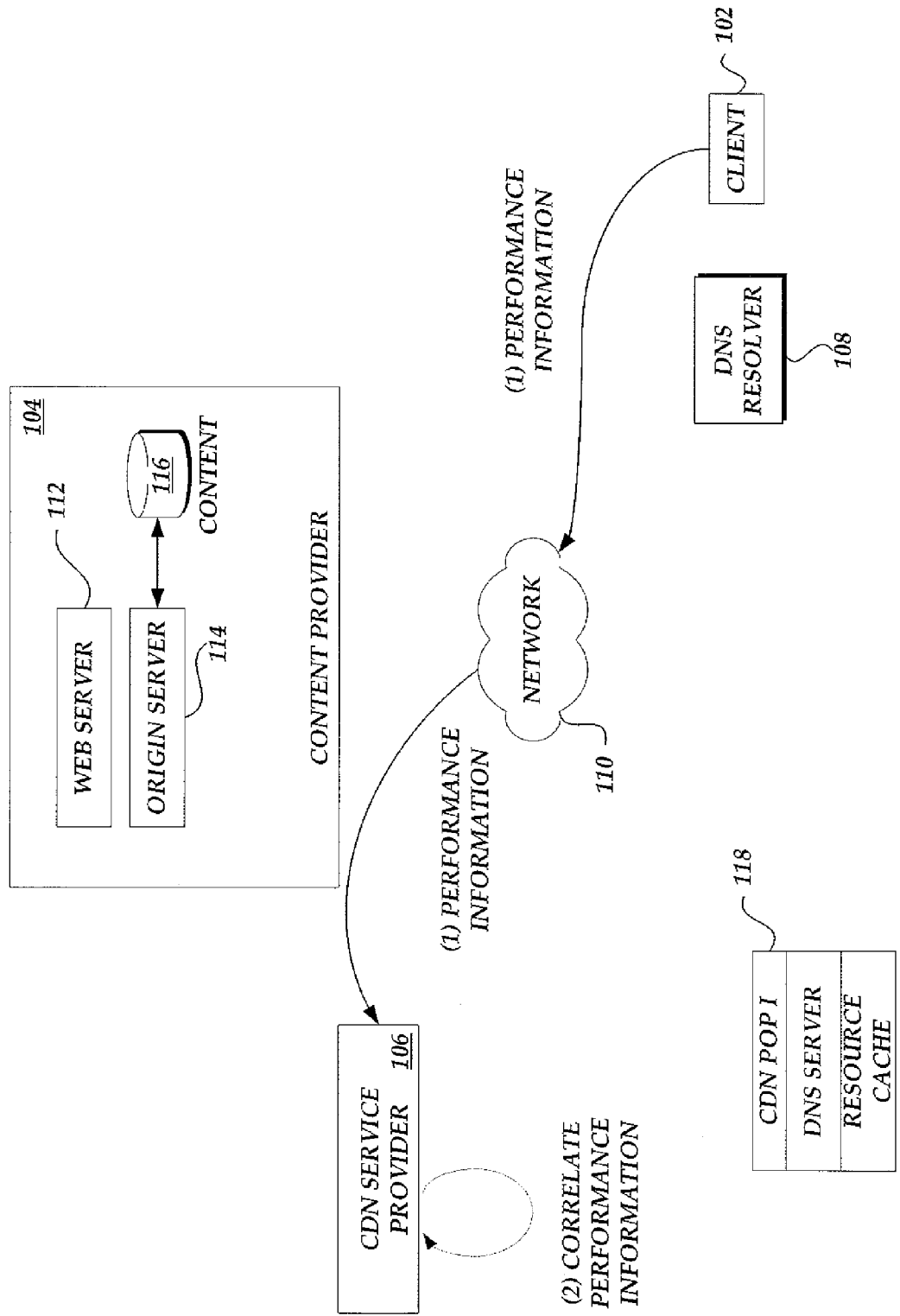
FIG. 6 is a block diagram of the content delivery environment of FIG. 1 illustrating the processing of performance information by a client computing device.

Turning now to FIG. 6, the client computing device 102 or other component transmits the collected performance information to the performance processing application 132. The performance information can be maintained in the client performance data store 130. Illustratively, the performance processing application 132 can the process the information to generate prioritized lists that determines the best performance for a class of computing devices, based on latency information. In one embodiment, the performance processing information for a particular service provider POP can be attributed to performance attributable to POPs associated with another service provider. For example, if a CDN service provider 106 and another service provider (e.g., a network storage service provider) maintain servers in the same POP or POPs sharing similar geographic or topological attributes (e.g., topologically nearby), the performance information associated with the CDN service provider 106 can be utilized by DNS nameserver components. The association of destinations to known POP locations can be generally referred to as collocation.

By way of illustrative example, a class of client computing devices 102 can correspond to all client computing devices 102 associated with a particular DNS resolver component 108 or network service provider. Illustratively, because the performance measurement information was associated between individual client computing devices and POPs, the performance processing application 132 can collect performance information from a set of client computing devices 102 in a class. Accordingly, the performance processing application 132 can then utilize additional statistical processing techniques, such as averaging, interpolation, extrapolation, and the like to determine performance information for the class of client computing devices. The performance information can be distributed.

Figure 7:
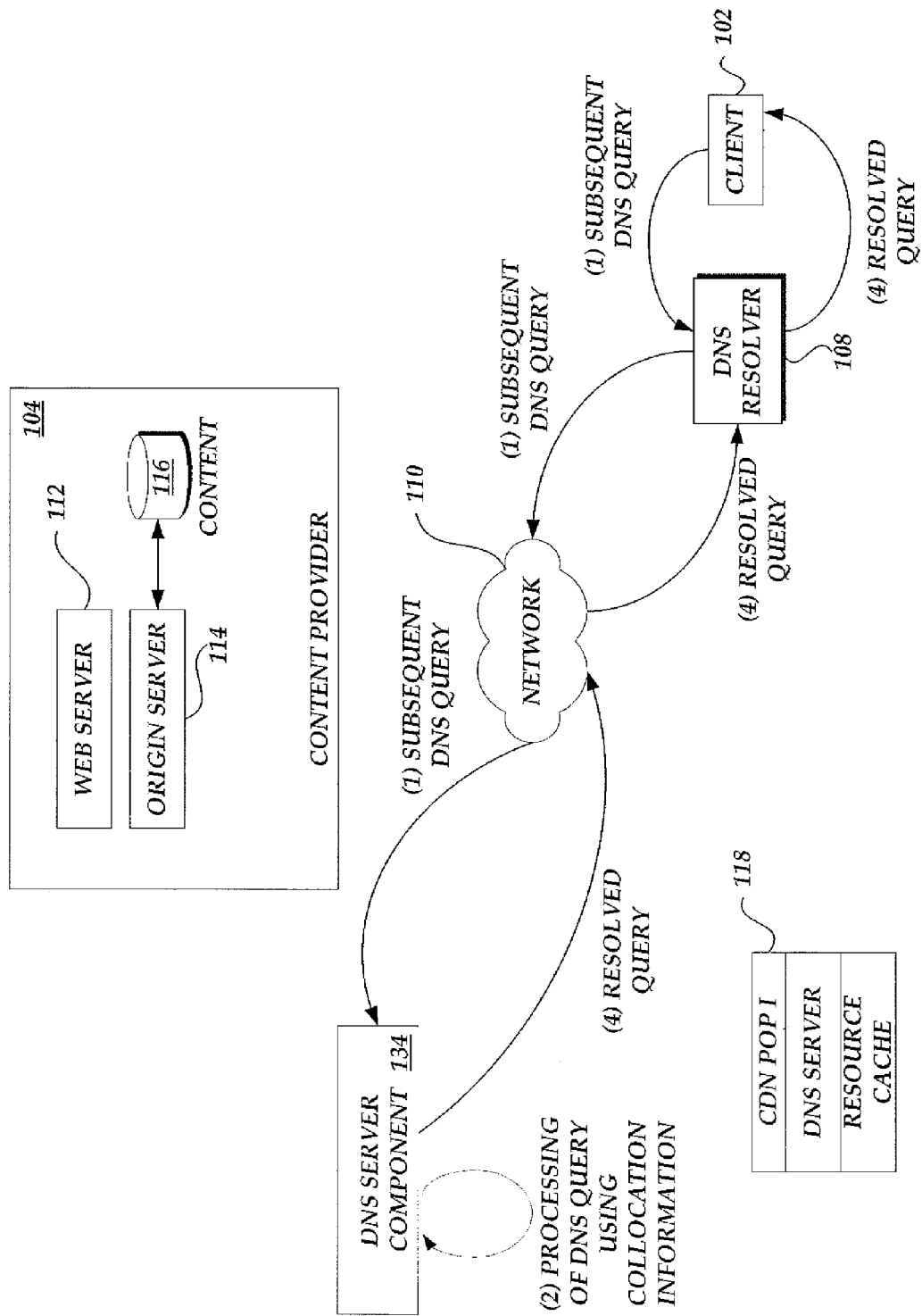
FIG. 7 is a block diagram of the content delivery environment of FIG. 1 illustrating the processing of subsequent DNS queries by client computing devices in accordance with prioritized information.

With reference to FIG. 7, a service provider, such as the DNS service provider 136 or CDN service provider 106, may subsequently obtain DNS queries from one or more client computing devices 102. Illustratively, the DNS service provider 136 attempts to resolve the DNS query by associating the client computing device 102 to the prioritized list of performance information associated with the classes of client computing devices. If prioritized information is available, the DNS service provider 136 resolves the request utilizing the prioritize information. Illustratively, the DNS service provider 136 can determine whether the destination of the DNS query is collocated with the prioritized list for the class of computing device. For example, the DNS service provider 136 can determine whether the destination corresponds to a POP identified in the prioritized information. If so, the prioritized information may be utilized to resolve the DNS queries by identifying the POPs that have the least amount of latency. Additionally, the DNS service provider 136 may conduct some type of health check to determine whether the DNS nameserver components included in the prioritized list are available to process requests. The health check information can determine absolute availability. Alternatively, the health check information can consider additional information such as load, resource utilization, and the like.

In some embodiments, if prioritized information is not available, then CDN service provider 106 can utilize alternative approaches for resolving the DNS query. In one aspect, the CDN service provider 106 can utilize geographic lookup information, such as associated with a client network address (e.g., IP address). In still another aspect, the CDN service provider 106 can utilize location information, such as regional information, based on which DNS nameserver receives the DNS query from the client computing device 102.

Figure 8:
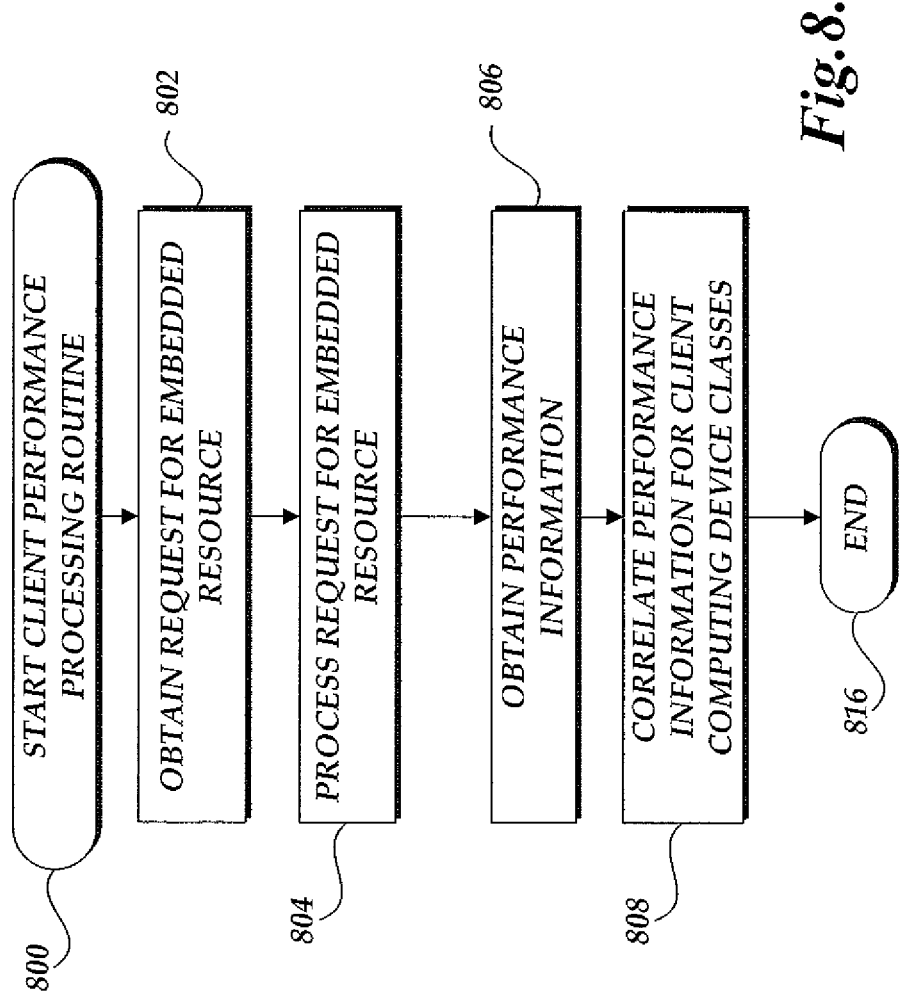
FIG. 8 is a flow diagram illustrative of a client computing device performance routine implemented by a CDN service provider.

With reference now to FIG. 8 one embodiment of a routine 800 implemented by the CDN service provider 106 for correlating client identifiers with other information will be described. One skilled in the relevant art will appreciate that actions/steps outlined for routine 800 may be implemented by one or many computing devices/components that are associated with the CDN service provider 106. Accordingly, routine 800 has been logically associated as being generally performed by the CDN service provider 106, and thus the following illustrative embodiments should not be construed as limiting. One skilled in the relevant are will appreciate that aspects of routine 800 may be implemented by other components, such as the components associated with the content provider 104.

At block 802, the CDN service provider 106 obtains a request for an embedded resource. As previously described, in an illustrative embodiment, the embedded resource may correspond to one of several embedded resources provided by a content provider 104 (FIG. 1) in response to an initial content request from a client computing device. The embedded resource can be in the form of a URL that results in the generation of the request by the client computing device 102 to the CDN service provider 106. At block 804, the CDN service provider 106 processes the request. As previously described, processing the request for the resource can include generating a confirmation message, an error message, a null value or returning a special image or file. For example, the CDN service provider 106 processes can return an image that cannot be displayed on a screen. In another example, the CDN service provider 106 processes may simply generate a response that indicates to a client computing device 102 that the request was received and processed.

Subsequent to the processing of the resource, at block 806, the CDN service provider 106 obtains performance information associated with processing the resource request. For example, the CDN service provider 106 can obtain latency information. In one embodiment, the client computing device 102 may be configured with a software application, software module or other functionality that facilitates the reporting of the performance information. In another embodiment, the client computing device 102 may execute code included in the content, such as scripts, that facilitates the collection and transmittal of the collected performance information.

At block 808, the CDN service provider 106 processes the collected performance information to generate prioritized list for a class of computing devices 102. In one embodiment, classes of computing devices may be organized according to a common DNS resolver, partially matching network address portions, utilizing of embedded identifiers, utilizing of tracking information (e.g., cookies), and the like. Illustratively, for each class, the CDN service provider 106 identifies which POP associated with the client computing device experiences the least amount of latency. Accordingly, individual client computing devices or client computing devices from the same class can repeat the transmission of requests or collection of performance information to a set of POPs provided by the CDN service provider 106.

As previously discussed, because the performance measurement information was associated between individual client computing devices and POPs, the performance processing application 132 can collect performance information from a set of client computing devices 102 in a class. Accordingly, the performance processing application 132 can then utilize additional statistical processing techniques, such as averaging, interpolation, extrapolation, and the like to determine performance information for the class of client computing devices. The performance information can be distributed. In other embodiments, the generation of the prioritized list can also incorporate weighting schemas that can factor service levels, reliability, and the like. The resulting prioritized lists can be stored, such as in the client performance data store 130. Additionally, the prioritized lists can be distributed to various POPs for utilization. At block 810, the routine 800 terminates.

Figure 9:
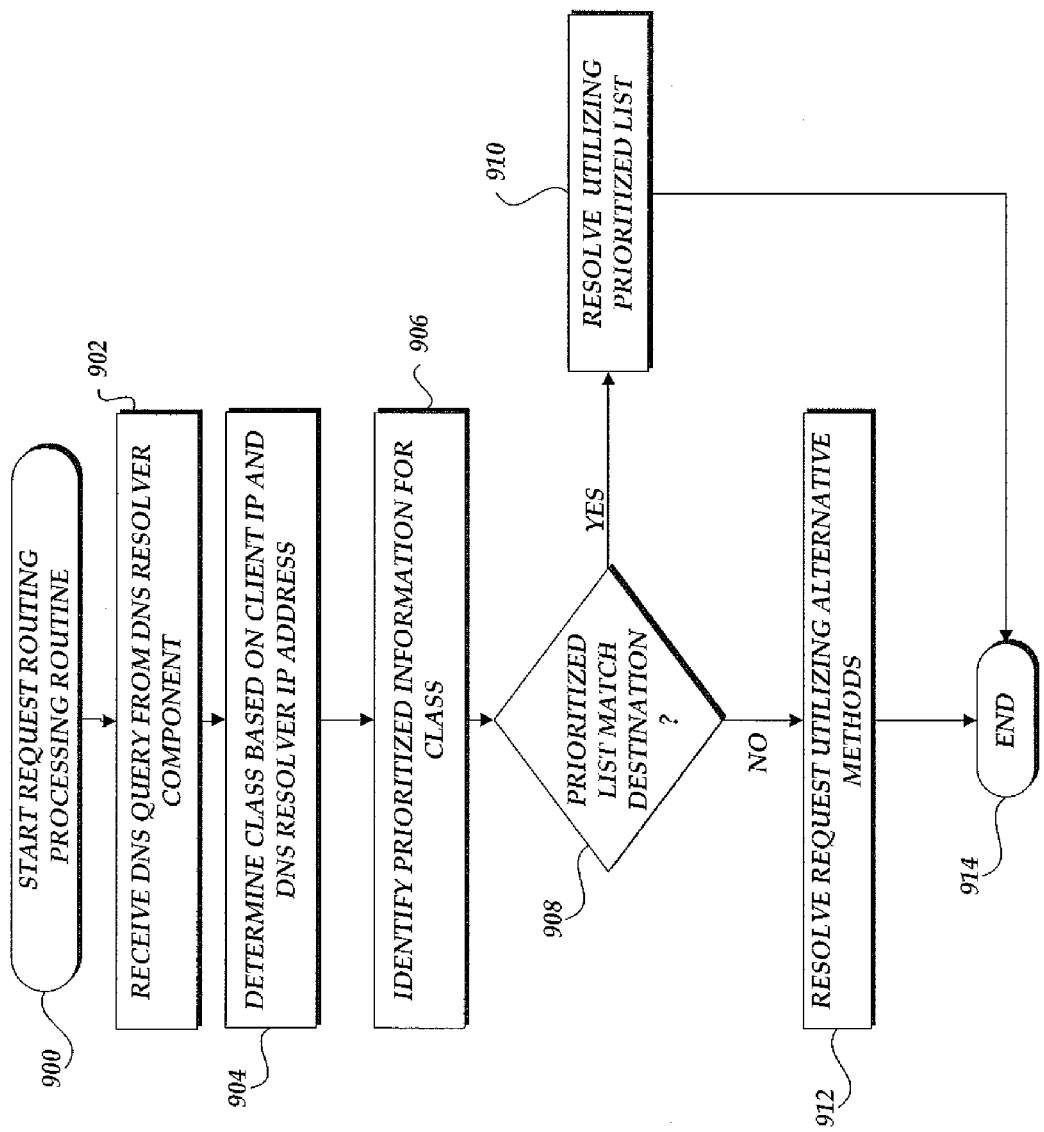
FIG. 9 is a flow diagram illustrative of a request routing processing routine implemented by a service provider.

With reference now to FIG. 9, one embodiment of a request routing routine 900 for routing information based on mapped client computing device 102 identifiers and DNS resolver 108 identifiers will be described. Specifically, a service provider, such as the DNS service provider 136 or CDN service provider 106, can utilize correlated client computing device identifier information, such as correlated IP address information, to optimize request routing processing. One skilled in the relevant art will appreciate that actions/steps outlined for routine 900 may be implemented by one or many computing devices/components that are associated with the DNS service provider 136 or CDN service provider 106. Additionally, routine 900 may be implemented by a combination of components from the DNS service provider 136 and CDN service provider 106 in embodiments in which both service providers share common control or ownership. Accordingly, routine 900 has been logically associated as being performed by the DNS service provider 136.

At a block 902, a DNS service provider 136 receives a DNS query corresponding to a requested resource from a client computing device 102, which may be transmitted via a DNS resolver 108. At block 904, the DNS service provider 136 determines a class for the client computing device 102 transmitting the request. Illustratively, the determination of class can be based on specific DNS resolver components 108 utilized to transmit the DNS request. In another embodiment, the DNS service provider 136 determines a class by matching at least portions of a network address that may be associated with an identifiable network, such as a network utilizing a common network service provider. In still a further embodiment, the determination of class can be based on additional identifier, such as embedded identifiers in the DNS portion of the URL. At block 906, the DNS service provider 136 attempts to identify whether prioritized list information previously generated by the CDN service provider 106 (FIG. 8) is available for the identified class.

At decision block 908, a test is conducted to determine whether the prioritized list information is available to be utilized to resolve the received DNS query. As previously discussed, the DNS service provider 136 can determine whether the destination of the DNS query is substantially collocated with the prioritized list for the class of computing device. For example, the DNS service provider 136 can determine whether the identified destination corresponds to a same geographic region for POP utilized in the generation of the prioritized information for the class of client computing device 102. The determination of collocation may be determined manually, such as by conducting one or more tests for different directions. Additionally, if so, the prioritized information may be utilized to resolve the DNS queries by identifying the POPs that have the least amount of latency.

If so, at block 910, the CDN service provider 106 attempts to resolve the DNS query by utilizing the prioritized list. Additionally, in some embodiments, the CDN service provider 106 may also attempt to conduct health check or availability check prior to resolving the request. If no prioritized list information exists or if the prioritized list information is not available to be used, at block 912, the CDN service provider 106 attempts to resolve the DNS query utilizing alternative methods. In one aspect, the CDN service provider 106 can utilize geographic lookup information, such as associated with a client network address (e.g., IP address). In still another aspect, the CDN service provider 106 can utilize location information based on which DNS nameserver receives the DNS query from the client computing device 102. At block 914, the routine 900 terminates.

It will be appreciated by one skilled in the relevant art that there are a number of ways to modify the routing information associated with requests from a class of client computing devices. It will further be appreciated by one skilled in the relevant art that the timing at which performance is monitored and updates to routing information are made can vary.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A non-transitory computer-readable storage medium having stored thereon instructions that, when executed, direct a service provider computing system to perform operations comprising:

providing, by the service provider computing system, at least one identifier for identifying an embedded resource provided by a content provider computing system;

generating, by the service provider computing system, at least one list based, at least in part, on performance information associated with previous requests for the embedded resource, wherein a generated list identifies point of presence servers associated with a class of computing devices;

obtaining, by the service provider computing system, a request for content from a client computing device responsive to the at least one identifier for the embedded resource provided by the content provider computing system;

determining, by the service provider computing system, a class of client computing devices associated with the client computing device based, at least in part, on an address associated with the client computing device;

determining, by the service provider computing system, whether a list of the at least one list is associated with the determined class of computing devices;

if the list is determined to be associated with the determined class of computing devices, resolving, by the service provider computing system, the request for content from the client computing device by identifying at least one point of presence server associated with the determined class of client computing devices from the list; and if the list is determined to not be associated with the determined class of computing devices, resolving, by the service provider computing system, the request for content based, at least in part, on location information associated with the request.

2. The non-transitory computer-readable storage medium as recited in claim 1, wherein the performance information relates to latency information.

3. The non-transitory computer-readable storage medium as recited in claim 1, wherein the at least one identifier corresponds to a uniform resource locator of the service provider computing system.

4. A method for processing content comprising:

obtaining, by a service provider computing system, performance information associated with processing of requests for resources from at least one class of client computing devices;

generating at least one list based, at least in part, on the performance information, wherein a generated list identifies point of presence servers associated with a class of the at least one class of client computing devices;

obtaining, by the service provider computing system, a domain name service request from a client computing device;

determining, by the service provider computing system, a class of computing devices of the at least one class of client computing devices associated with the client computing device;

determining, by the service provider computing system, whether a list is associated with the determined class of computing devices;

if a list is determined to be associated with the determined class of computing devices, resolving, by the service provider computing system, the domain name service request by identifying at least one point of presence server associated with the determined class of client computing devices from the list; and if a list is not determined to be associated with the identified class of computing devices, resolving, by the service provider computing system, the domain name service request based, at least in part, on location information associated with the request.

5. The method as recited in claim 4 further comprising providing, by a service provider computing system, an identifier for identifying one or more the resources.

6. The method as recited in claim 5, wherein the at least one identifier corresponds to a uniform resource locator of at least one of a content provider computing system or the service provider computing system.

7. The method as recited in claim 4 further comprising conducting, by the service provider computing system, availability checking prior to resolving the domain name service request.

8. The method as recited in claim 4, wherein the determined class of computing device associated with the client computing device corresponds to an association of a domain name server resolver component.

9. The method as recited in claim 4, wherein the determined class of computing device associated with the client computing device corresponds to an association of at least a portion of a network address.

10. The method as recited in claim 4, wherein obtaining the performance information associated with processing of a request for resources includes obtaining performance information from the client computing device executing code associated with an embedded resource identifier.

11. The method as recited in claim 4, wherein obtaining the performance information associated with processing of a request for a resource includes obtaining performance information from a content provider computing system executing code associated with the embedded resource identifier.

12. A computer-implemented system for processing content, the system comprising:
- an electronic data store configured to store performance information associated with at least one class of computing devices, wherein the performance information is associated with requests for content; and
- a computing system in communication with the electronic data store and comprising a processor, the processor configured to execute specific computer-executable instructions to at least:
  - generate at least one list based, at least in part, on the performance information, wherein a generated list identifies point of presence servers associated with a class of the at least one class of computing devices;
  - obtain a domain name service request from a client computing device;
  - determine a class of computing devices of the at least one class of computing devices associated with the client computing device;
  - determine whether a list is associated with the identified class of computing devices;
    - if a list is determined to be associated with the determined class of computing devices, resolve the domain name service request by identifying at least one point of presence server associated with the determined class of client computing devices from the list; and
    - if a list is determined not to be associated with the determined class of computing devices, resolve the domain name service request based at least in part on location information associated with the request.

13. The system as recited in claim 12, wherein the requests for content are associated with an identifier, wherein the identifier corresponds to a uniform resource locator of at least one of a service provider or a content provider.

14. The system as recited in claim 12, wherein the class of computing device corresponds to an association of a domain name server resolver component.

15. The system as recited in claim 12, wherein the class of computing device corresponds to an association of at least a portion of a network address.

16. The system as recited in claim 12, wherein the processor is further configured to execute specific computer-executable instructions to at least conduct availability checking prior to resolving the domain name service request.

17. The system as recited in claim 12, wherein the performance information corresponds to latency information associated with processing the domain name service request.

18. The system as recited in claim 12, wherein the performance information is generated by a content provider.

\* \* \* \* \*